No. 657,053.  
C. H. BLOMSTROM.  
MECHANISM FOR PROPELLING BOATS.  
(Application filed Oct. 26, 1899.)  
(No Model.)  
Patented Aug. 28, 1900.  
4 Sheets—Sheet 1.

Witnesses:  
Fred Gerlach  
Katharine Gerlach

Inventor:  
Carl H. Blomstrom  
By Price & Fisher  
his Attorneys.

No. 657,053. Patented Aug. 28, 1900.
C. H. BLOMSTROM.
MECHANISM FOR PROPELLING BOATS.
(Application filed Oct. 26, 1899.)
(No Model.) 4 Sheets—Sheet 2.
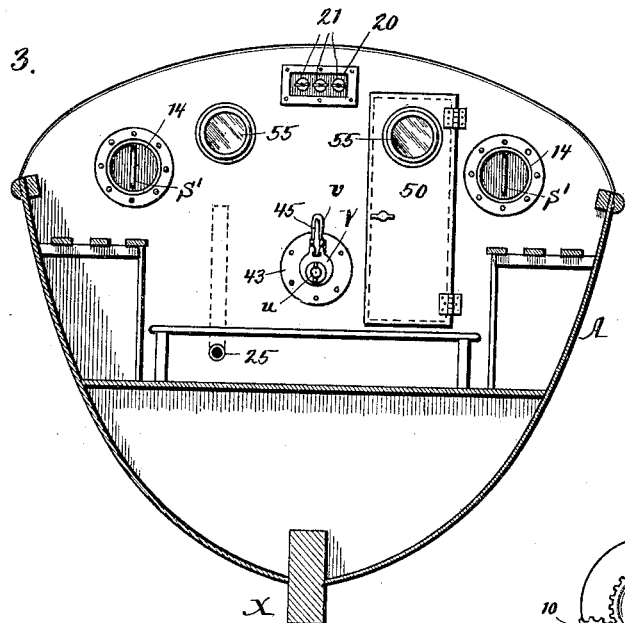
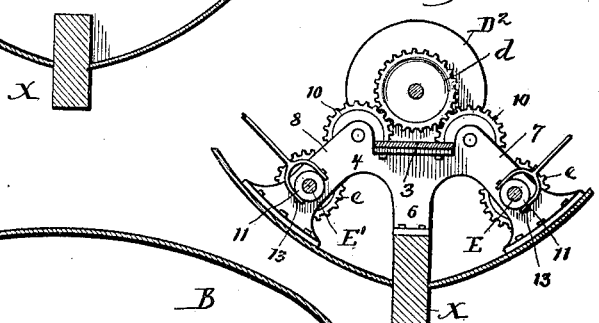
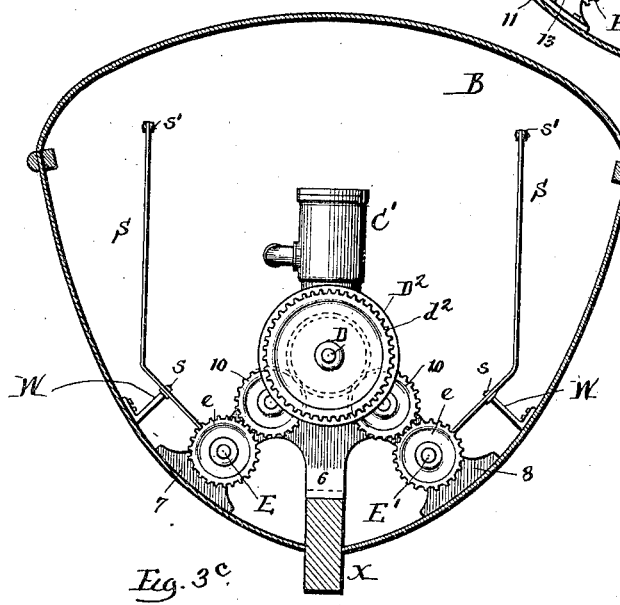
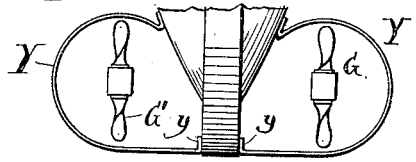
Witnesses:
Fred Gerlach
Katharine Gerlach
Inventor:
Carl H. Blomstrom
By Penn & Fisher
his Attorneys.

No. 657,053. Patented Aug. 28, 1900.
C. H. BLOMSTROM.
MECHANISM FOR PROPELLING BOATS.
(Application filed Oct. 26, 1899.)
(No Model.) 4 Sheets—Sheet 3.
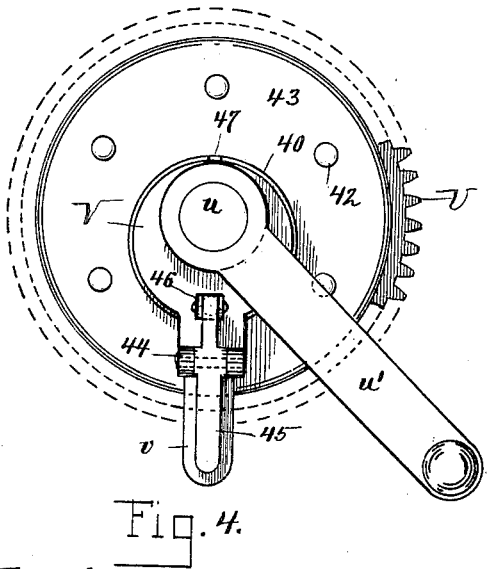
Fig. 4.
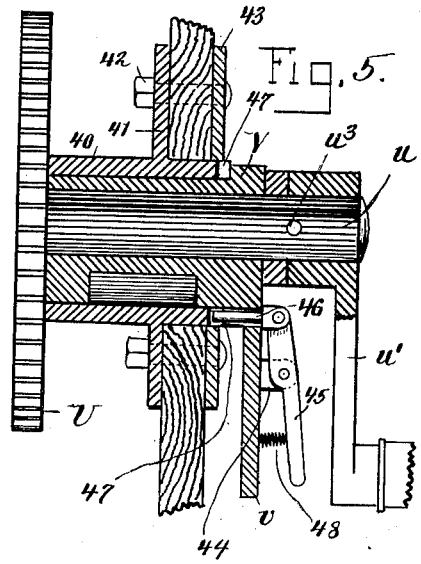
Fig. 5.
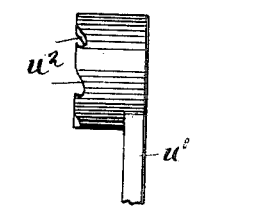
Fig. 5.ª
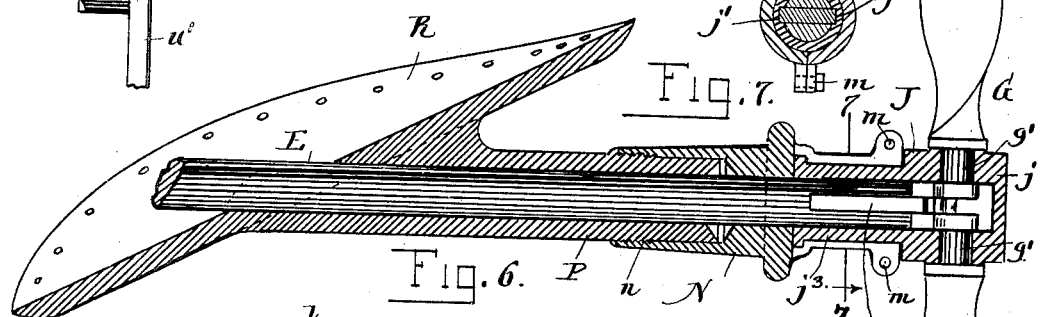
Fig. 6. Fig. 7.
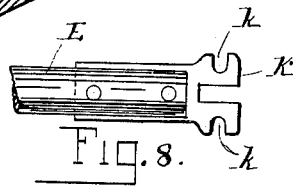
Fig. 8.
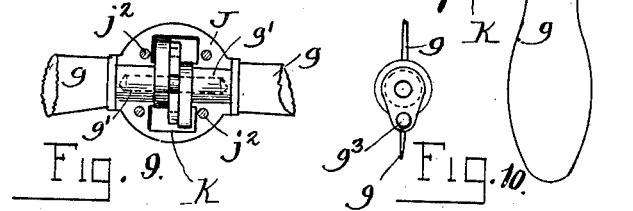
Fig. 9. Fig. 10.
Witnesses
Fred Geilach
Katharine Gerlach
Inventor
Carl H. Blomstrom
By Pierce & Fisher
his Attorneys.

No. 657,053.  
C. H. BLOMSTROM.  
MECHANISM FOR PROPELLING BOATS.  
(Application filed Oct. 26, 1899.)  
(No Model.)  
Patented Aug. 28, 1900.  
4 Sheets—Sheet 4.

Witnesses  
Fred Gulack  
Katharine Gulack

Inventor  
Carl H. Blomstrom  
By Prin & Fisher  
his Attorneys.

UNITED STATES PATENT OFFICE.

CARL H. BLOMSTROM, OF MARQUETTE, MICHIGAN, ASSIGNOR TO THE LAKE SHORE ENGINE WORKS, OF SAME PLACE.

MECHANISM FOR PROPELLING BOATS.

SPECIFICATION forming part of Letters Patent No. 657,053, dated August 28, 1900.

Application filed October 26, 1899. Serial No. 734,804. (No model.)

*To all whom it may concern:*

Be it known that I, CARL H. BLOMSTROM, a resident of Marquette, county of Marquette, State of Michigan, have invented certain new and useful Improvements in Mechanism for Propelling Boats, of which the following is a full, clear, and exact description.

The object of this invention is to provide life-boats or similar boats having air-tight compartments with mechanism whereby an engine located in an air-tight compartment and furnishing the power for propelling the boat can be controlled from outside said compartment.

The invention consists in the various features of improvement hereinafter described, illustrated in the accompanying drawings, and particularly pointed out in the claims at the end of this specification.

Figure 1:
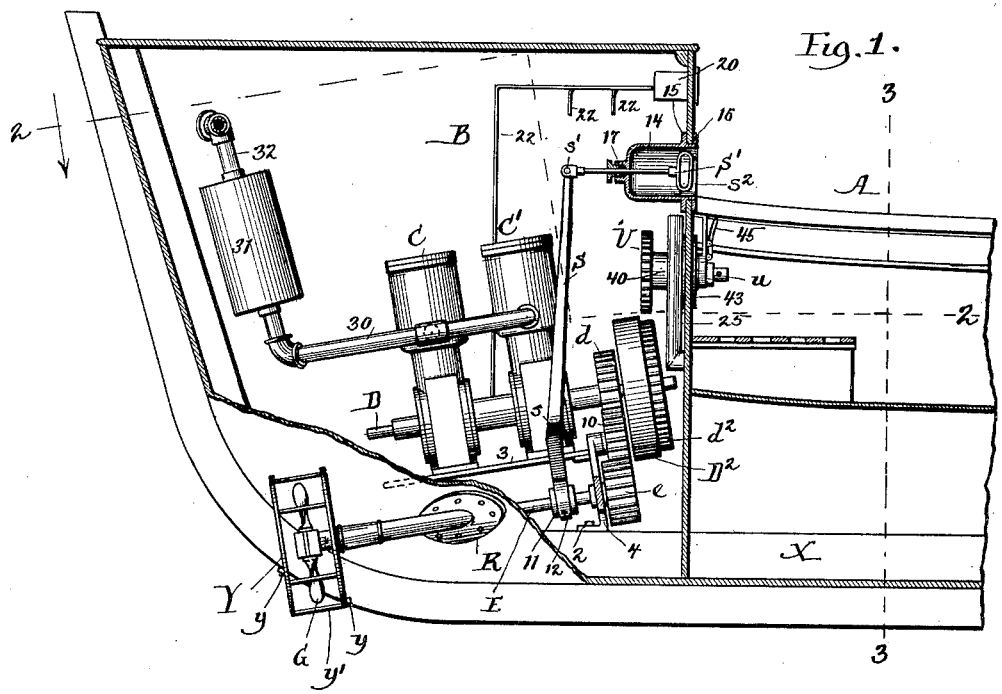
Figure 2:
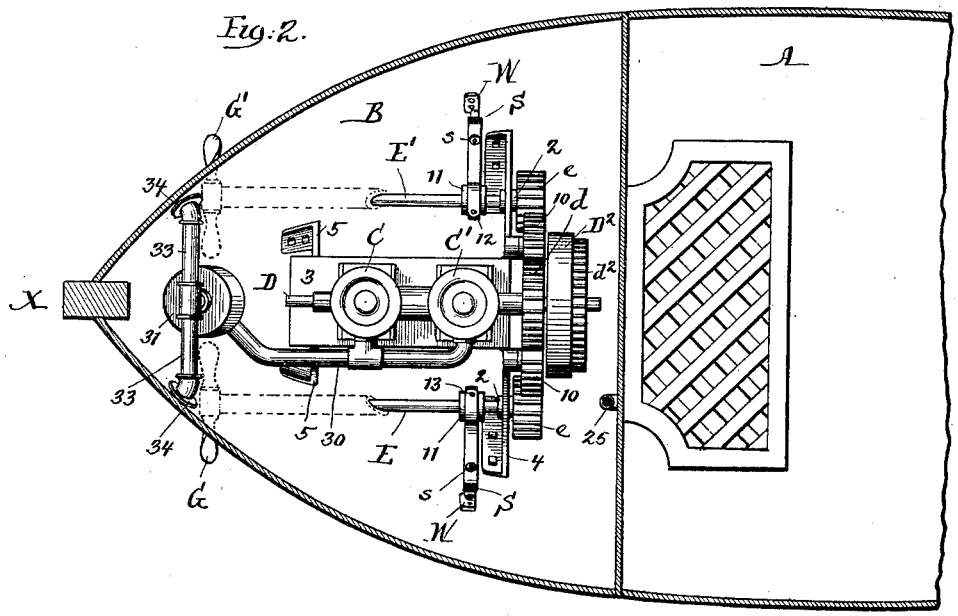
Figure 11:
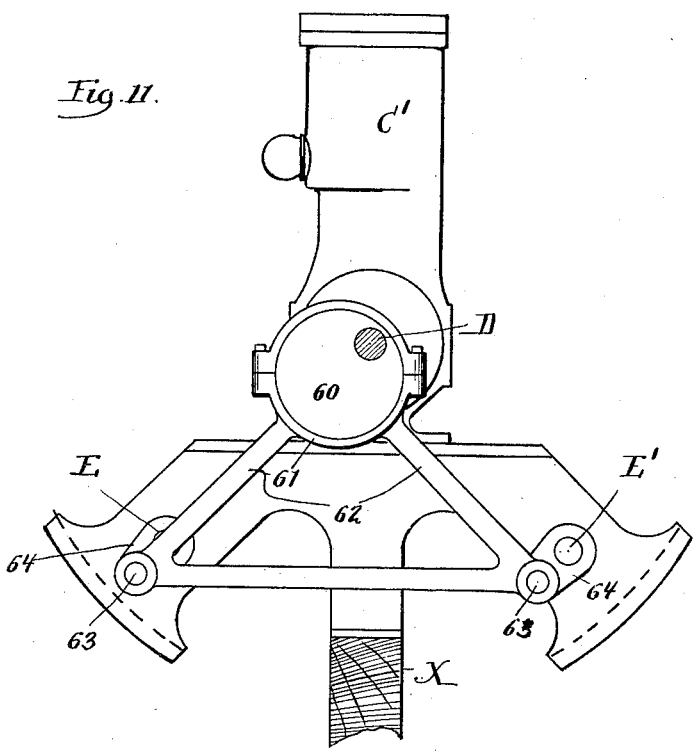
Figure 12:
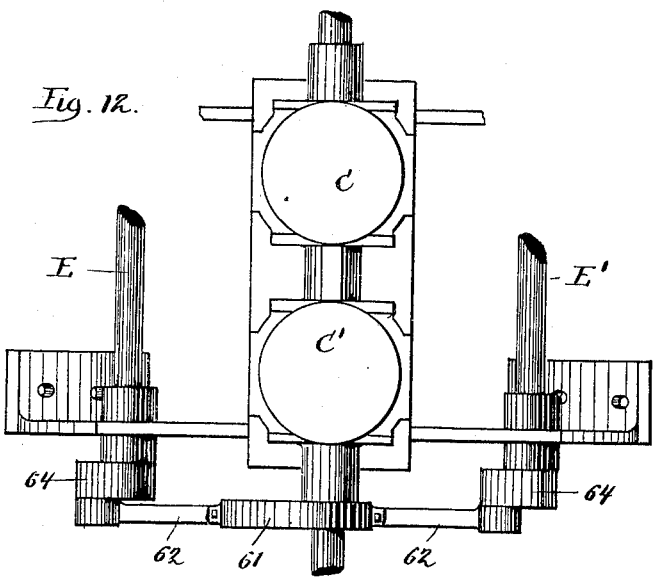

Figure 1 is a view, partly in side elevation and partly in vertical longitudinal section, through the stern of a life-boat having my invention applied thereto. Fig. 2 is a view in horizontal section on line 2 2 of Fig. 1. Fig. 3 is a view in vertical cross-section on line 3 3 of Fig. 1 looking toward the stern of the boat. Fig. 3ª is a view in vertical cross-section through the hull of the boat, the front of the rear air-tight compartment and parts carried thereby being removed. Fig. 3ᵇ is a detail view, in vertical cross-section, through the frame that supports the engine, looking toward the front. Fig. 3ᶜ is a detail view of the lower part of the stern of the boat, showing the guards for the propeller-wheels. Fig. 4 is an enlarged detail front view of part of the mechanism for effecting the starting of the engine. Fig. 5 is a view in central vertical section through the parts shown in Fig. 4, the gear-wheel being shown in elevation. Fig. 5ª is a detail view, in side elevation, of the hub of the crank-handle, whereby the starting mechanism is operated. Fig. 6 is an enlarged view, in vertical longitudinal section, through the outboard-bearing of one of the propeller-shafts, the shaft being shown in elevation. Fig. 7 is a view in vertical cross-section on line 7 7 of Fig. 6. Fig. 8 is a detail plan view of the rear end of the propeller-shaft. Fig. 9 is an end view of the hub of the propeller-wheel, showing parts of the blades journaled therein and showing the end of the propeller-shaft. Fig. 10 is a detail inner end view of one of the propeller-blades. Fig. 11 is a detail front view showing a modified mechanism for imparting revolution to the twin propeller-shafts. Fig. 12 is a plan view of the mechanism shown in Fig. 11.

In the accompanying drawings I have shown my invention applied to a life-boat of the type now commonly employed in the United States life-saving service.

A designates the body of the boat, and B denotes the air-tight compartment at the stern thereof. Within the compartment B is located the engine that will furnish the motive power for propelling the boat. As shown, this engine is a gasolene-engine and preferably of the construction illustrated in the accompanying drawings, although manifestly other types of engines might be employed in connection with certain features of my invention. The engine shown has its cylinders C and C' arranged in tandem, and gasolene or like fuel will be supplied to the engine in any convenient manner, the fuel being delivered by a pipe that will lead through the wall of the compartment B. The crank-shaft D of the engine has keyed thereto a gear-wheel $d$, and from this single crank-shaft revolution will be transmitted, preferably by the gearing next to be described, to two propeller-shafts E and E', that are located upon opposite sides of the keel of the boat at its stern. Each of the propeller-shafts E and E' is journaled in an outboard-bearing R, and its inner end is journaled in a bearing 2 of the main frame. The main frame is so formed as to effectively sustain the weight of the engine mainly upon the keel of the boat, the main frame being braced from the sides of the boat. As shown, the main frame comprises a base-plate 3, whereon the engine rests, this base-plate being sustained by a front standard 4 and a rear standard 5. The front standard 4 has a central portion 6, that rests upon and is suitably secured to the keel X of the boat and has the side portions 7 and 8, the extended flanges of which conform to the angle of the hull of the boat and are securely fastened thereto. The rear standard 5 is shaped similarly to the front standard 4, but is somewhat smaller, as it occupies a position nearer the stern of the boat, and both the front and rear standards are securely bolted to the base-plate 3 of the main frame.

The inner end of each of the propeller-shafts E and E′ is furnished with a gear-pinion $e$, that meshes with idler-pinions 10, that in turn mesh with the main driving gear-wheel $d$ on the crank-shaft D of the engine. The inner end of the crank-shaft D is shown as provided with a fly-wheel $D^2$, with which is connected a gear-wheel $d^2$, the purpose of which gear-wheel will hereinafter more fully appear. It will be observed that each of the gear-pinions $e$ at the inner end of the propeller-shafts is formed with a broader face than the idler-pinion with which it engages, the purpose of this construction being to insure the constant engagement of the pinion $e$ with the idler-gears 10, notwithstanding the longitudinal movement that will be imparted to the propeller-shaft in order to vary the angle of the propeller-blades, as will hereinafter appear. The propeller-wheels G G′ have their blades $g$ journaled in a suitable box or hub J, the shanks $g'$ of each of the propeller-blades being engaged by a cap-plate $j$, that is suitably bolted, as at $j^2$, to the body of the box or hub J. The stem $g'$ of each of the propeller-blades $g$ is provided with a crank-arm having a pin $g^5$, that will enter a notch or recess $k$ in a shifting plate or extension K, that is bolted to the outer end of the propeller-shaft E or E′. Hence it will be seen that as the propeller-shaft is moved in longitudinal direction the propeller-blades $g$ $g$ will be turned so as to cause these blades to cut the water at a different angle, and thus to move the boat either in forward or backward direction or modify or arrest its speed, as desired. The hub or bearing J is formed with one or more longitudinal grooves $j'$, within which will set the edge of the shifter plate or extension K, thereby causing the hub J, and consequently the propeller-wheel, to revolve with its corresponding propeller-shaft E. In order to hold the hub or bearing J upon the shaft E against longitudinal movement, while permitting it to revolve with the shaft, I prefer to form the outer surface of the hub or bearing J with a reduced cylindrical portion $j^3$, over which sets a two-part bearing, (see Figs. 6 and 7,) the flanged sections of this bearing being bolted together, as at $m$. It will be understood, of course, that one of the sections of the bearing is either formed in piece with or bolted to the sleeve or gland N, that is interiorly screw-threaded, as at $n$, to engage a corresponding thread formed adjacent the outer end of the sleeve P, that projects rearwardly from the expanded plate R of the outboard journal-bearing. The sleeve or gland N is preferably formed with a concaved recess to receive suitable packing, and a similar recess is preferably formed at the outer end of the sleeve P. The broad plate R at the inner end of the outboard-bearing sleeve P will be made to conform to the outer wall of the boat and will be securely bolted or riveted thereto, as shown in Fig. 1 of the drawings. Each of the propeller-shafts E and E′ is provided with a collar 11, having an annular groove to receive a shifting-ring 12, the pins 13 of which ring project through slots formed in the lower bifurcated end of the corresponding shifting-lever S, one of such levers being provided for each of the propeller-shafts E and E′. Each shifting-lever S is pivoted, as at $s$, to a bracket W, attached to the hull of the boat, and to the upper end of each of the shifting-levers S is pivotally connected, as at $s'$, the inner end of a hand-rod S′, that extends through the rear wall of the cup-shaped chamber 14, that is securely bolted to the front wall of the compartment B. Preferably each of the cup-shaped chambers 14 is formed with an interior flange 15, adjacent its outer end, this flange serving to receive screw-bolts or rivets, that pass through the front wall of the air-tight compartment and through a retaining-ring 16 at the outside of the air-tight compartment. The hand-rods S′ are each furnished with a suitable handle $s^2$, whereby the rods may be moved back and forth in order to operate the shifting-levers S  To the rear wall of the chambers 14 are attached stuffing-boxes 17, through which the rods S′ pass, these stuffing-boxes serving to permit the movement of the rods without allowing access of air or water to the interior of the compartment B.

The operation of the parts thus far described will be seen to be as follows: From the foregoing description it will be seen that when the engine is started, preferably by mechanism next to be described, revolution will be imparted from the crank-shaft D through the train of gears to each of the propeller-shafts E E′ and to the corresponding propeller-wheels G G′. The operator at the front of the compartment B can by means of the handles $s^2$ and rods S′ move the shifting-levers S back and forth, so as to cause the propeller-shafts E E′ to move in corresponding forward-and-backward direction, and thus vary the angle of the propeller-blades of the wheels G G′. In this way the boat may be driven in forward direction at its maximum speed or the speed may be reduced or the direction of travel reversed at the will of the operator, or by varying the relative positions of the blades of the wheels G and G′ the boat can be readily steered or turned around. By locating the engine within the air-tight compartment B and by providing this engine with means whereby its movements may be controlled from outside the compartment all danger of access of air or water to the air-tight compartment is avoided. This is especially desirable in the case of life-boats, that are constantly subjected to heavy seas and are frequently upset, provision being commonly made whereby such boats will be automatically righted. The object in providing the cup-shaped chambers 14 for the hand-rods S′ is to avoid the extension of these rods materially beyond the front wall of the air-tight compartment, so that all danger of the breakage of the rods or their being caught by the lines of the boat is avoided.

The particular form of the shifting device for varying the angle of propeller-blades is not broadly claimed in this application, but is made the subject-matter of another application filed by me on January 25, 1900, Serial No. 2,933.

In order to supply the necessary lubricant to the various bearings of the engine, I provide the front wall of the air-tight compartment with an inset chamber or recess 20, within which the cups 21 for lubricant will be placed, and pipes 22 will lead from the oil-cups 21 to the various journal-bearings of the engine.

In order to provide means for admitting the necessary supply of air to the engine when a gasolene or gas engine is used, I provide the wall of the air-tight compartment with an admission or tube 25, the lower end of which is set over an opening formed in the air-tight-compartment wall, and the upper end of the air-tube is extended toward the top of the air-tight compartment to such distance that even should the boat fill with water no water would pass to the interior of the air-tight compartment. A further advantage of this arrangement of the air-tube 25 is that in case the boat is overturned the tube also serves to prevent the access of water to the air-tight compartment, because the lower end of the tube is located at such point that when the boat is overturned the induction end of the air-tube will be above the water-line.

The cylinders C and C' of the engine are connected by suitable branches to an exhaust-pipe 30, that preferably leads to a muffle-chamber 31, that is connected by a pipe 32 to branch pipes 33, the couplings 34 at the ends of which pipes cover discharge-ports formed in the sides of the air-tight compartment at the stern of the boat. My object in providing two discharge-ports for the products of combustion of the engine is to insure a more effective discharge, notwithstanding the washing of the sea against one or the other side of the boat. In practice, however, I have found that the force of the exhaust will serve to prevent the entrance of water into these ports. It is manifest that the muffle-chamber might be omitted and the exhaust-pipe be directly connected to one or both of the exhaust-ports.

In order to effect the starting of the engine from outside the air-tight compartment, I provide within the air-tight compartment a gear-wheel U, the shaft $u$ of which extends through the air-tight compartment and is provided with a crank-handle $u'$, whereby the shaft may be turned. As shown, the shaft $u$ passes through an eccentric opening in the carrier-block V, that is journaled in a bearing-sleeve 40, (see Fig. 5,) the flange 41 of which sleeve is connected to the front wall of the air-tight compartment by bolts 42, that also pass through a retaining-ring 43, located on the outer face of the air-tight-compartment wall. Connected to or formed integral with the carrier-block V is an arm or extension $v$, having projecting lugs 44, between which is pivoted the grip-handle 45, and the inner end of this grip-handle has pivoted thereto a pin 46, that passes through a hole in the arm or extension $v$ and is adapted to enter either of several notches 47, formed at the outer end of the sleeve 40. A coil-spring 48 is located between the free end of the grip-handle 45 in the arm or extension $v$ and serves to force the pin 46 into normal engagement with one or the other of the notches 47.

From the foregoing description it will be seen that when the engine is started the operator will depress the free end of the grip-handle 45, so as to relieve the pin 46 from engagement with the lower notch 47 and will then turn the arm or extension $v$, thereby shifting the eccentric carrier-block V until the gear-wheel U is brought into engagement with the gear-wheel $d^2$ upon the outer end of the crank-shaft D. Then by turning the crank-handle $u'$ the operator can effect the initial turning of the crank-shaft necessary to start the engine. As soon as the engine has been started the gear-wheel U will obviously be rapidly revolved, and in order to prevent the revolution of the crank-handle $u'$ it is preferred to connect this crank-handle with the shaft $u$ in such manner that the crank-handle will not partake of the forward revolution of the shaft. To insure this, I prefer to provide the inner end of the hub of the crank-handle with a series of notches $u^2$, adapted to engage a pin $u^3$ projecting from the shaft $u$, and it will thus be seen that when the crank-handle $u'$ is set over the end of the shaft the notches $u^2$ will interlock with the pin $e^3$, so as to allow the turning of the shaft $u$; but when the engine is started and rapid revolution is imparted to the shaft $u$ the pin $u^3$ will simply ride out of the notches $u^2$ of the crank-handle, at the same time moving the crank-handle toward the end of the shaft $u$. It will be understood, of course, that after the engine has been started the crank-handle $u'$ may be removed, and the operator will then, by turning the arm or extension $v$ to the position shown in Fig. 5 of the drawings, lift the gear-wheel U out of engagement with the gear-wheel $d^2$.

In order to permit access to the interior of the air-tight compartment, its front wall is preferably provided with a hinged door 50, the edges of this door being adapted to tightly close against the wall of the air-tight compartment and the interior of the door being furnished with lock mechanism similar to that used upon fireproof safes, so that when the door is closed it will form an air-tight joint with the chamber or opening in the front wall of the air-tight compartment. Preferably, also, the front wall of the air-tight compartment is provided with one or more openings fitted with glasses 55, through which the operator can readily inspect the engine within the air-tight compartment.

It is desirable, particularly with boats used in life-saving service, to protect the propeller-wheels G and G', so as to prevent their being caught or broken by wreckage or in the landing of the boat, and for this reason I provide on each of the propeller-wheels G and G' a suitable guard Y, these guards consisting of bent metal bars, the lower ends of which are fastened, as at y, to the keel of the boat, while the upper ends of the bars are securely bolted to the sides of the boat. The bars of each of the guards Y are connected at proper intervals by cross-bars y'.

It is manifest that the precise details of construction above set out may be varied within wide limits without departing from the spirit of the invention.

So far as I am aware my invention comprises the first instance in which an engine has been located within an air-tight compartment or in which provision has been made whereby the operation of the engine from outside the compartment could be controlled.

I do not wish the invention to be understood as restricted to the details of construction above set out, since manifestly these may be varied by the skilled mechanic within wide limits. Thus, for example, in Figs. 11 and 12 of the drawings I have illustrated modified gearing for transmitting motion from the crank-shaft D to the propeller-shafts E E', located at opposite sides of the engine. In this form of the invention the crank-shaft has keyed thereto an eccentric 60, that is encircled by a yoke 61, connected with a triangular frame 62. At opposite ends of the base of the triangular frame 62 are formed holes to receive wrist-pins 63, that project from the crank 64, attached to the forward ends of the propeller-shafts E E'. From the foregoing description it will be seen that as the crank-shaft D is revolved it will cause revolution to be imparted to the propeller-shafts E E' through the medium of the eccentric, the triangular frame, and the cranks at the forward ends of the propeller-shafts.

Having thus described my invention, what I claim as new, and desire to secure by Letters Patent, is—

1. The combination with a boat having an air-tight compartment, of an engine located within said compartment and whereby the boat is propelled and mechanism extending outside said compartment and whereby the operation of the engine is controlled.

2. The combination with a boat having an air-tight compartment, of an engine located within said compartment and whereby the boat is propelled, a propeller-shaft driven by said engine, a shifter for varying the angle of the propeller-blades located within said compartment and a rod connected to said shifter and extending outside said compartment.

3. The combination with a boat having an air-tight compartment, of an engine located within said compartment and whereby the boat is propelled, a shifting-lever located within said compartment and engaging a movable part of the engine, a shifting-rod connected to said shifting-lever and extending outside the compartment and a cup-shaped chamber attached to the wall of said compartment and through which chamber said shifting-rod passes.

4. The combination with a boat having an air-tight compartment, of an engine located within said compartment and whereby the boat is propelled, a longitudinally-movable propeller-shaft extending from said engine outside said compartment, a shifting-lever within the compartment having one end connected to said longitudinally-movable propeller-shaft, and a shifting-rod connected to the opposite end of said shifting-lever and extending outside said compartment.

5. The combination with a boat having an air-tight compartment, of an engine located within said compartment and whereby the boat is propelled, a lubricator located outside said compartment and a tube leading from said lubricator to a journal of the engine within the compartment.

6. The combination with a boat having an air-tight compartment, of an engine located within said compartment and whereby the boat is propelled, a propeller-shaft driven by said engine, a shifter connected with said propeller-shaft, a shifting-rod connected to said shifter and extending outside said compartment and a cup-shaped chamber attached to the wall of said compartment and provided with a stuffing-box through which said rod passes.

7. The combination with a boat having an air-tight compartment, of a liquid-fuel engine located within said compartment and whereby the boat is propelled and an air-delivery pipe having an upturned end and having its lower end communicating with an air-port in the wall of said compartment.

8. The combination with a boat having an air-tight compartment, of a liquid-fuel engine located within said compartment and whereby the boat is propelled, a pipe for products of combustion connected with said engine at one end and having its opposite end suitably connected with an exhaust-port formed in the wall of said compartment.

9. The combination with a boat having an air-tight compartment, of a liquid-fuel engine located within said compartment and whereby the boat is propelled, and an exhaust-pipe for products of combustion connected at one end to said engine and having its opposite end connected with branch pipes that are coupled to exhaust-ports located upon opposite sides of said compartment.

10. The combination with a boat having an air-tight compartment, of a liquid-fuel engine located within said compartment and whereby the boat is propelled, an exhaust-pipe for products of combustion connected at one end to said engine and having its opposite end connected with branch pipes that are coupled to exhaust-ports located upon opposite sides of said compartment, and a muffle-chamber located within said compartment and interposed in said exhaust-pipe.

11. The combination with a boat having an air-tight compartment, of an engine located within said compartment and whereby the boat is propelled, and a base for supporting said engine having standards secured to the keel of the boat and provided with lateral extensions secured to the sides of the hull of the boat.

12. The combination with a boat having an air-tight compartment, a starting-gear within said compartment for imparting initial movement to said engine, a shaft extending through the wall of said compartment, and a handle located upon the outer end of said shaft and whereby revolution may be imparted to said shaft to start the engine.

13. The combination with a boat having an air-tight compartment, of an engine located within said compartment and whereby the boat is propelled, a gear-wheel located within said compartment for starting the engine, a shaft connected to said gear-wheel and extending outside the compartment, an eccentric block or bearing whereby said gear-wheel may be thrown into and out of action and means for turning said eccentric bearing to bodily shift said gear-wheel.

14. The combination with a boat having an air-tight compartment, of an engine located within said compartment and whereby the boat is propelled, starting mechanism for said engine comprising a gear-wheel located within the compartment, a shaft connected to said gear-wheel and extending outside said compartment, means whereby said shaft may be turned, an eccentric bearing or block extending through said compartment and whereby said gear-wheel may be thrown into and out of engagement, and an arm or extension whereby said eccentric block may be turned.

15. The combination with a boat having an air-tight compartment, of an engine located within said compartment and whereby the boat is propelled, starting-gear mechanism for said engine comprising a gear-wheel connected with the engine, a second gear-wheel located within said compartment, a shaft connected to said second gear-wheel extending outside said compartment, an eccentric block or bearing through which said gear-wheel shaft passes, an arm or extension for turning said eccentric block in order to throw said gears into and out of engagement, a crank for turning said shaft and a bearing-sleeve for said eccentric bearing or block fastened to the wall of said compartment.

CARL H. BLOMSTROM.

Witnesses:
GEO. P. FISHER, Jr.,
ALBERTA ADAMICK.